Patented Mar. 16, 1943

2,314,091

UNITED STATES PATENT OFFICE 2,314,091

ART OF REGULATING THE GROWTH OF PLANTS

Franklin D. Jones, Upper Darby, Pa., assignor to American Chemical Paint Company, Ambler, Pa., a corporation of Delaware No Drawing. Application August 4, 1940, Serial No. 351,435

14 Claims. (Cl. 47—58)

The present invention relates to the art of regulating or controlling the growth of plants. More particularly stated, the invention has reference to that branch of the art which concerns itself with the application to plant life of "plant hormones."

In one of its aspects, the invention is directed to distinctively new and useful compositions containing plant hormones. In another of its aspects, the invention is directed to methods for applying plant hormones or compositions containing such substances to plants.

The invention of the present disclosure is of general application to all substances that can be classified as plant hormones, and, hence, for the purpose of this invention, the term "plant hormones" may be defined as organic substances of either natural or synthetic origin which exhibit the property of being able to influence, regulate or control the growth of plants, even when present in minute concentration. Without restricting the invention beyond what is required by the state of the prior art, auxin $a$, auxin $b$ and heteroauxin (indole-acetic acid) are given as examples of naturally occurring plant hormones, and the following compounds are given as examples of synthetic plant hormones:

Phenyl, naphthyl indole, fluorene, anthracene, naphthoxy and acenaphthene acetic, propionic and butyric acids, naphthyl-hexoic acid and indole-valeric acids, as well as the amides, thioamides, nitriles, lower alkyl esters and alkali metal and ammonium salts of said acids.

The acids in the foregoing list will hereinafter be referred to as "plant hormone acids." Many of the derivatives of the plant hormone acids such as the chlorides, aldehydes, alcohols and ketones apparently do not exhibit growth activity, and such derivatives are specifically excluded from the term "plant hormones" as used in this disclosure. However, I am not precluded from using one or more of the derivatives, which apparently do not exhibit growth activity, as fillers or as additional ingredients in my composition.

As has been stated, the present invention is applicable to plant hormones in general. The invention is also applicable in general to the various purposes in the art of growth control or regulation for which plant hormones are suitable. For example, the compositions and methods of the invention may be used to speed up the germination of seeds, and to stimulate the formation of roots, buds and flowers. They may also be used to produce seedless fruits without the use of pollen (parthenocarpy), and to prevent or retard the formation of the abscission layer on fruit trees, thereby preventing premature fruit drop. In addition, they may be used as described in my prior applications Serial Nos. 187,933 and 247,366, filed January 31, 1938, and December 23, 1938, respectively, (now Patents Nos. 2,276,234 and 2,258,291 respectively) to eradicate the lower or parasitic plants such as fungi and the diseases caused by the fungi.

The term "plants" as used in the present disclosure and in the appended claims is intended to include plants, slips, leaf cuttings, stem cuttings, scions, tubers, roots, seeds, bulbs, seedlings, fruit and flowers, wherever the context permits.

As has already been indicated, the essential active ingredient of the composition is a plant hormone. The composition also contains an acidifying agent such as citric, tartaric, succinic, malic, maleic, fumaric and sulfamic acids. These acids are available in dry, powdered form, are not deliquescent, are readily soluble in water, are practically non-toxic to plant life, and have the property of imparting a pH of 4 or less, when the composition is mixed with water. The latter property is of great importance, because of the demonstrated fact that plant hormones can enter plant cells more rapidly at low pH. A pH below 4 has been found entirely satisfactory in practice; optimum results being obtained at a pH about 3.

Several of the acids above mentioned, such as citric and tartaric, exert what is technically known as buffer action, while sulfamic acid does not. If the composition contains an acid which does not exert buffer action, I may advantageously add a buffer salt. The use of buffer salts may be rendered necessary by local conditions such as the nature of the water. A buffer salt may be employed, even if the acid used does exert buffer action.

In general the salt of any weak acid or weak base may be used as a buffer salt. As examples of suitable buffer salts may be mentioned the alkali salts of citric, tartaric or succinic acids. Other examples of buffer salts are acetates, borates and phosphates of the alkali metals. Disodium phosphate ($Na_2HPO_4$) is mentioned as a specific example of a suitable phosphate.

The composition may advantageously contain a wetting agent. It has been found in practice that wetting agents greatly increase the penetration of the composition into the plant tissue. For instance, a wetting agent added to a composition particularly formulated to stimulate rooting increases the rooting effect of the hormone on cuttings to such an extent that the composition is equivalent to a composition containing three times as much hormone.

As examples of suitable wetting agents may be mentioned the sulphonated derivatives of the higher saturated alcohols; i. e., alcohols of the formula $CH_3(CH_2)_nCH_2OH$, where "$n$" may be ten or more. As examples of suitable alcohols may be mentioned lauryl or cetyl alcohol, and as examples of suitable sulphonated derivatives may be mentioned sodium lauryl sulphate or sodium cetyl sulphate. I have found many of the commercially available wetting agents very well suited for the purposes of the present invention. As suitable examples may be mentioned "Alkanol" (sodium sulphate of alkyl naphthalene), "Avirol" (sodium cetyl sulphate), "Avitex," "Gardinol" (sodium lauryl sulphate), "Tergitol," and "Ultrawet."

In the preferred embodiment of the invention, the aforementioned ingredients in dry powdered form are intimately and thoroughly mixed and ground together in a suitable form of apparatus, as for instance a ball mill. A dry powdered filler such as talc, bentonite, clay, kaolin, charcoal, ground carbon or wood flour may advantageously be mixed in. The filler serves not only to dilute the plant hormone so as to protect the plant from too great a dose of hormone, but also to prevent caking of the composition. For spraying trees, the filler also serves to produce better adhesion of the composition to the tree, its fruit, leaves and flowers. The filler also renders it possible to use a wetting agent in liquid form. In such case, it is merely necessary to mix the dry filler with the wetting agent so as to absorb the wetting agent in the filler. Then the other dry ingredients may be thoroughly mixed in.

The manner in which the ingredients are mixed together results in a dry granular composition in which the maximum amount of surface is presented for intermixture with water. When the composition is brought into contact with water, the wetting agent causes the individual particles of the composition to be quickly wetted. The particles of the composition are preferably of such a fine size that the wetted composition can be immediately applied to its intended purpose without waiting for the hormone to dissolve completely. When the wetted composition is applied to a plant, sufficient moisture surrounds each particle so that the plant hormone eventually dissolves and is absorbed by the plant. This is of particular importance as plant hormones in general are sparingly soluble in water. In addition to facilitating wetting of the plant hormone when mixed with water, the wetting agent, as has been stated, increases penetration of the plant hormone into the plant being treated. The penetration of the plant hormone is also greatly increased by the presence of the acidifying and buffering agent.

Plant hormones are generally effective when present in very minute concentration. Hence, a relatively minute proportion of the composition of the invention is a plant hormone or a mixture of plant hormones. The relative proportions of the ingredients depend upon a number of factors, including the particular plant hormone, the nature of the filler, the particular species and form of plant to be treated, the length of time that the plant is to be exposed to the composition, and the particular purpose for which the composition is to be applied.

Before giving examples of illustrative compositions, it should be stated that other ingredients may be included in the composition in addition to or in place of part of some of the already mentioned ingredients. The additional ingredients may be substances having some particular effect on plant life such as nutrients, fertilizers, vitamins or substances which either form vitamins in situ or which facilitate the production of vitamins in the plant. As examples of additional ingredients may be mentioned granulated sugar, vitamin B, $B_1$ or C, nicotinic acid, thiourea and ammonium thiocyanate. As disclosed in my prior application Serial No. 247,366, filed December 23, 1938, (now Patent No. 2,258,291) thiourea and ammonium thiocyanate, though not usually considered as plant hormones, exhibit growth activities and may be employed to great advantage either alone or in conjunction with plant hormones.

The following is given by way of example of a suitable composition for spraying trees to produce seedless fruit (parthenocarpy) as in the case of holly (*Ilex opaca*), or to prevent premature dropping of flowers or fruits:

| | Parts by weight |
|---|---|
| Naphthylacetamide (plant hormone) | 2 |
| Alkanol (wetting agent) | 3 |
| Powdered citric acid | 110 |
| Talc (vehicle or carrier) | 112 |

Part of the naphthylacetamide may be replaced with another hormone such as naphthylacetic acid.

The ingredients should be thoroughly and intimately mixed and ground together. To prepare the composition for use, it is merely necessary to mix with water in the proportions of one pound of composition to each 200 gallons of water. The aqueous mixture, when sprayed on flowers or fruits at the proper time, serves to prevent the formation of the abscission layer, and hence prevents premature drop. The mixture may also be used to produce seedless fruit as has been stated.

Another illustrative composition contains the following ingredients:

| | Parts |
|---|---|
| Naphthyl-acetic acid | 44 |
| Naphthylacetamide | 121 |
| Alkanol | 132 |
| Powdered citric acid | 3000 |
| Sulfamic acid | 1185 |
| Talc | 5518 |

Part of the naphthyl-acetic acid or naphthylacetamide may be replaced with another plant hormone.

The foregoing composition is to be applied as a spray to prevent premature fruit drop by mixing one pound of the composition with 200 gallons of water. This represents one part of the composition in 1600 parts of spray, or a hormone concentration of .001%.

In the case of each of the illustrative examples, a suitable summer oil such as Nursery Volck may be added to the aqueous mixture to assist penetration. The summer oil, which may be added in the proportion of 1 pint to each 100 gallons of spray also appears to make the composition stick to the plant.

The following is an excellent composition for application to cuttings, seeds or bulbs:

| | Parts |
|---|---|
| Naphthylacetamide | 22 |
| Thiourea | 5 |
| Citric acid | 200 |
| Talc | 9,773 |
| Total | 10,000 |

Part of the naphthylacetamide may be replaced with another plant hormone. Thus, I have replaced 10 parts of naphthylacetamide with an equivalent amount of naphthylthioacetamide.

The ingredients of the foregoing specific example are mixed and ground to a fine powder.

To apply the composition to cuttings, the base of the cuttings are preferably moistened and dipped into the dry mixture. The adhering layer of powder is wetted by the moisture of the cuttings, and the plant hormone gradually dissolves and is taken up by the plant. Rooting is thereby stimulated and speeded up.

The composition of the foregoing example may also be used to speed up the germination of seeds. The seeds are mixed with the dry powder until evenly coated. The relative proportions of powder and seed depend upon the particular kind of seed. For instance, in the case of lawn grass seed, suitable proportions are 1 part of the dry powder per 160 parts of seed; in the case of tobacco seed, suitable proportions are 1 part of the composition to 60 parts of seed, and in the case of corn, suitable proportions are 1 part of composition to 480 parts of seed.

It is to be noted that the composition may be applied for its intended purpose in either dry or moistened form. However, moisture must be present either in the plant or in the environment of the plant before the hormone can take effect on the plant. The moisture may be supplied by adding water directly to the composition, as when the composition is used as a spray. In the case of cuttings, the moisture may advantageously be supplied by wetting the cuttings before applying the dry composition. It will be understood that in many cases the water may be added to the soil or sand in which the plant is growing.

In marked contrast to hormone-containing compositions of the prior art, the present composition particularly in its dry granular form, has excellent keeping qualities and may be kept indefinitely before being used. After the composition is mixed with water, it should be used for its intended purpose as soon as possible, and in actual practice, I have found that the composition may be used within twenty-four hours without any appreciable deterioration.

Having described my invention with the particularity and exactness required by the patent statutes, I wish it to be understood that the present disclosure is illustrative rather than restrictive, and that changes and modifications may be resorted to without departing from the spirit or scope of the invention as defined in the hereunto appended claims.

I claim:

1. A composition of matter for regulating or controlling the growth of plants, more than one part in one thousand parts of said composition consisting of a plant hormone, said composition also containing a non-toxic acidifying agent, all the ingredients of said composition being in dry powdered form intimately mixed together, said composition, when mixed with water, having a pH not greater than 4.

2. A composition of matter for regulating or controlling the growth of plants, a relatively minute proportion of said composition consisting of a plant hormone, said composition also containing a non-toxic acidifying agent and a wetting agent, all the ingredients of said composition being in dry powdered form intimately mixed together, said composition, when mixed with water, having a pH not greater than 4.

3. A composition of matter for regulating or controlling the growth of plants, a relatively minute proportion of said composition consisting of a plant hormone, said composition also containing a non-toxic acidifying agent, a wetting agent and a vehicle or carrier, all the ingredients of said composition being in dry powdered form intimately mixed together, said composition, when mixed with water, having a pH not greater than 4.

4. A composition of matter for regulating or controlling the growth of plants, more than one part in one thousand parts of said composition consisting of a plant hormone, said composition also containing a non-toxic acidifying agent selected from the group consisting of citric, tartaric, succinic, malic, maleic, fumaric, and sulfamic acids, all the ingredients of said composition being in dry powdered form intimately mixed together, said composition, when mixed with water, having a pH not greater than 4.

5. A composition of matter for regulating or controlling the growth of plants, a relatively minute proportion of said composition consisting of naphthylacetamide, said composition also containing a non-toxic acidifying agent, all the ingredients of said composition being in dry powdered form intimately mixed together, said composition, when mixed with water, having a pH not greater than 4.

6. A composition of matter for regulating or controlling the growth of plants, a relatively minute proportion of said composition consisting of naphthyl-acetic acid, said composition also containing a non-toxic acidifying agent, all the ingredients of said composition being in dry powdered form intimately mixed together, said composition, when mixed with water, having a pH not greater than 4.

7. A composition of matter for regulating or controlling the growth of plants, a relatively minute proportion of said composition consisting of naphthyl-acetic acid, said composition also containing citric acid, all the ingredients of said composition being in dry powdered form intimately mixed together, said composition when mixed with water, having a pH not greater than 4.

8. A composition of matter for regulating or controlling the growth of plants, a relatively minute proportion of said composition consisting of naphthyl-acetic acid, said composition also containing citric acid and a vehicle or carrier, all the ingredients of said composition being in dry powdered form intimately mixed together, said composition, when mixed with water, having a pH not greater than 4.

9. A method of treating plants to regulate or control their growth, which consists in mixing the composition defined in claim 1 with water, and applying said mixture to the plant.

10. A method of treating plants to regulate or control their growth, which consists in mixing the composition defined in claim 2 with water, and applying said mixture to the plant.

11. A method of treating plants to regulate their growth, which consists in mixing the composition defined in claim 4 with water, and applying said mixture to the plant.

12. A method of treating plants to regulate or control their growth, which consists in mixing the composition defined in claim 5 with water, and applying said mixture to the plant.

13. A method of treating plants to regulate or control their growth, which consists in mixing the composition defined in claim 6 with water, and applying said mixture to the plant.

14. A method of treating plants to regulate or control their growth, which consists in applying the composition of claim 1 to the plant in the presence of moisture.

FRANKLIN D. JONES.